United States Patent [19]

Nakata et al.

[11] Patent Number: 5,895,626
[45] Date of Patent: Apr. 20, 1999

[54] STERILIZING METHOD, APPARATUS AND CONTAINER OF SOLID MATTER OR LIQUID MATTER CONTAINING SOLID MATTER

[75] Inventors: Takaji Nakata; Shinji Sakamoto, both of Tendo; Tsutomu Yamamoto, Kashiba; Megumi Imamura, Higashiosaka; Ryuichi Tsutsumi, Hirakata; Tetsuo Asahara, Higashiosaka, all of Japan

[73] Assignees: Nishirei Corporation, Tokyo; Hisaka Works Limited, Osaka, both of Japan

[21] Appl. No.: 08/619,517

[22] PCT Filed: Aug. 30, 1995

[86] PCT No.: PCT/JP95/01732

§ 371 Date: Sep. 23, 1996

§ 102(e) Date: Sep. 23, 1996

[87] PCT Pub. No.: WO96/06540

PCT Pub. Date: Mar. 7, 1996

[30] Foreign Application Priority Data

| Sep. 1, 1994 | [JP] | Japan | 6-208548 |
| Sep. 1, 1994 | [JP] | Japan | 6-208553 |
| Sep. 1, 1994 | [JP] | Japan | 6-208554 |
| Sep. 14, 1994 | [JP] | Japan | 6-220477 |

[51] Int. Cl.$^6$ .............. A61L 2/08; B01F 11/00; B65B 55/00; B01B 00/00
[52] U.S. Cl. .............. 422/26; 422/307; 366/208; 426/399; 426/400; 426/401
[58] Field of Search .............. 366/208; 422/26, 422/307; 426/399, 400, 401

[56] References Cited

U.S. PATENT DOCUMENTS 4,307,965  12/1981  Catarious et al. .............. 366/208
4,522,015  6/1985  Hildebolt .............. 53/425

Primary Examiner—Frank C. Eisenschenk
Assistant Examiner—Hankyel T. Park
Attorney, Agent, or Firm—Nikaido, Marmelstein, Murray & Oram LLP

[57] ABSTRACT

The invention presents a method, apparatus and container for sterilizing solid matter or liquid matter containing solid matter efficiently in a short time, while preventing deterioration of quality or decline of flavor.

In this method, solid matter (a) and liquid matter (b) are separately heated and sterilized, and both are mixed after being sterilized, and put and sealed in a bag (c) or container. When heating and sterilizing the solid matter independently, the solid matter is weight and dispensed in each retainer (c) by the portion of one pack each, and sterilized, and is transferred, after being sterilized, from the retainer (d) into a bag (c) or container, and sealed. Sterilization is executed by rotating the retainer (d) and inducing an agitating action on the inside solid matter. The apparatus comprises a sterilizing tank 22 or 42 for receiving and supporting a plurality of retainers (d) by a plurality of guide rails 22e so as to allow to roll in an aligned state, and an oscillating device 40 or 72 for oscillating it like a seesaw. The retainer (d), that is, a container 81 is formed in a cylindrical cup form on the outer circumference so as to be easy to roll and rotate, and the inner circumference and inner bottom are provided with means for promoting agitation of the solid matter.

29 Claims, 12 Drawing Sheets

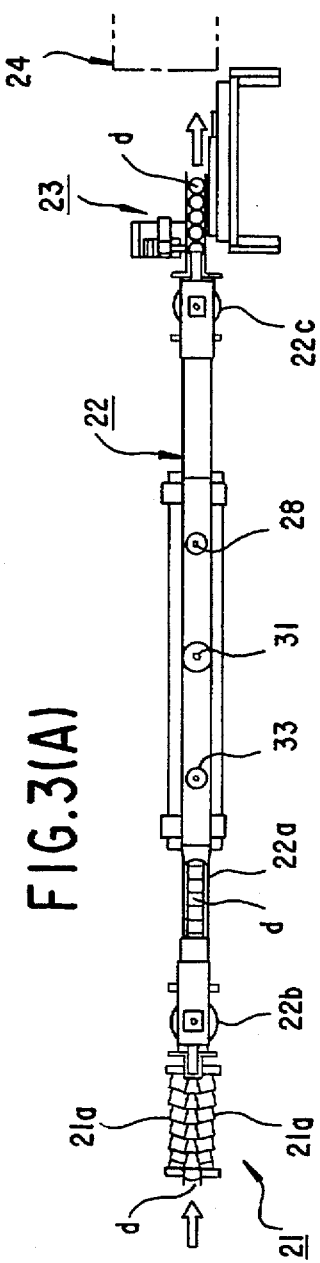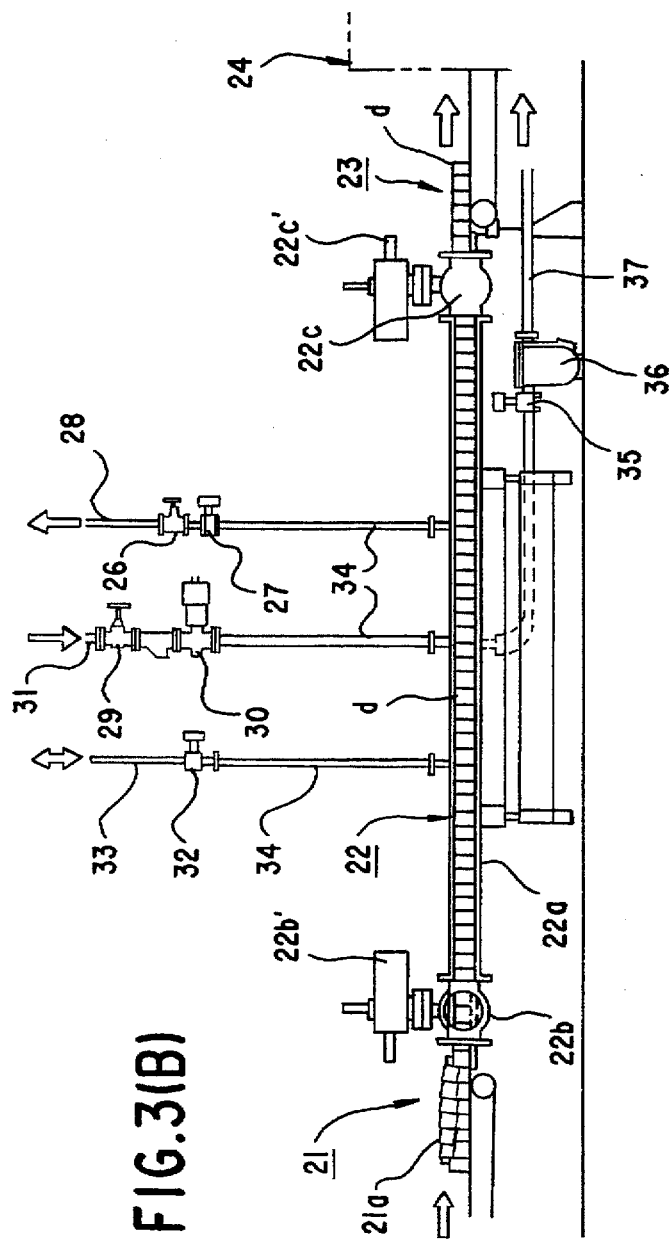

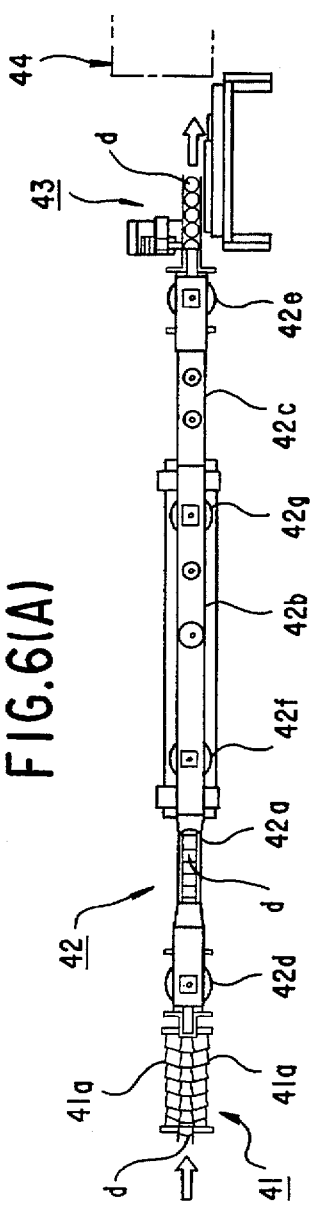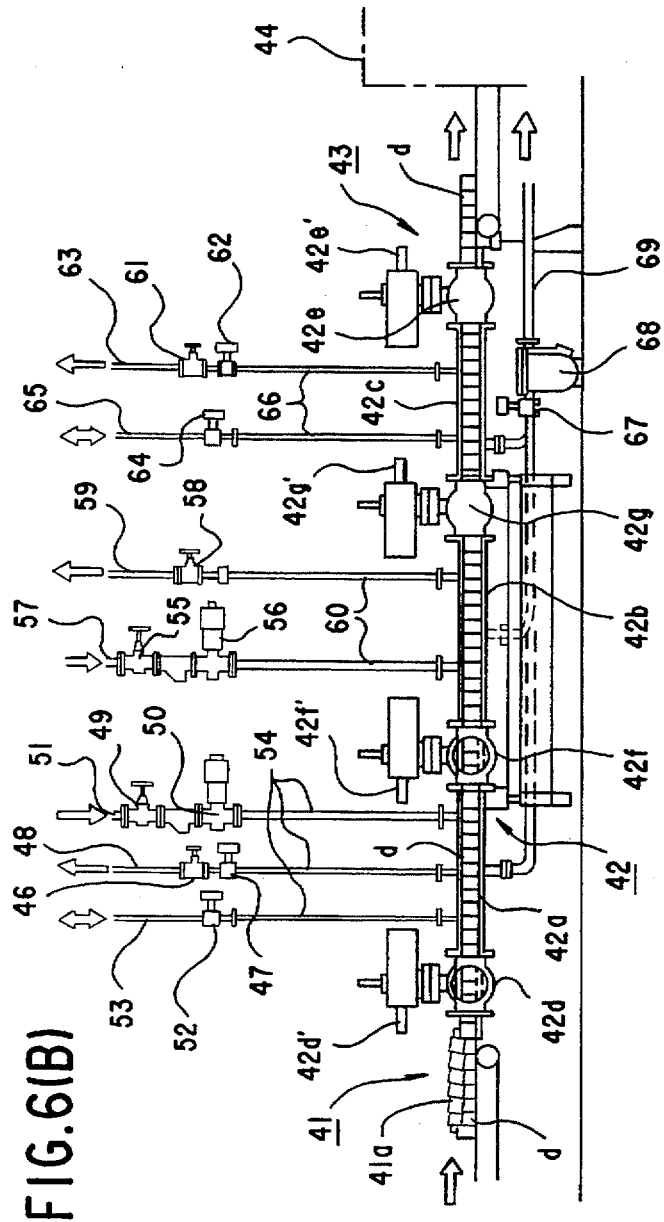

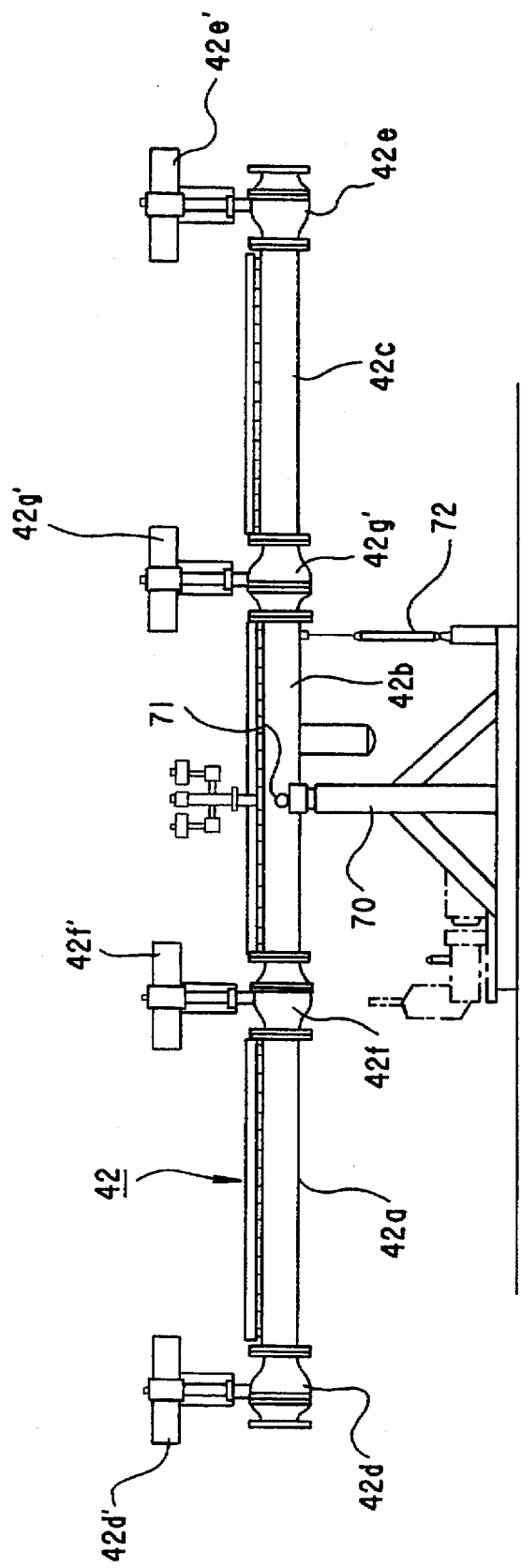

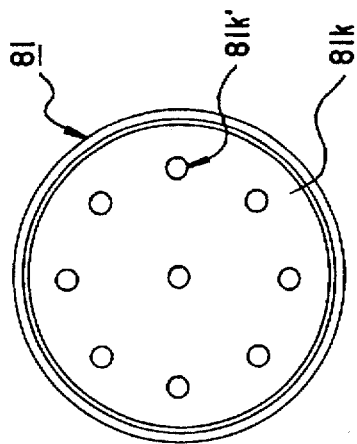
FIG.9(E)
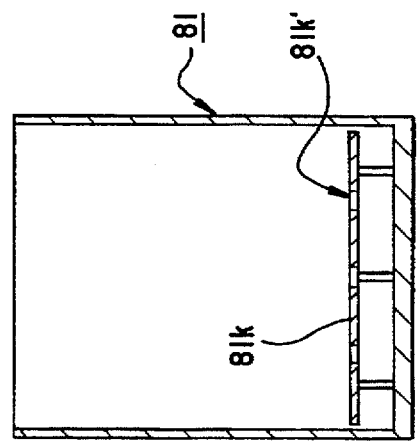
FIG.9(F)
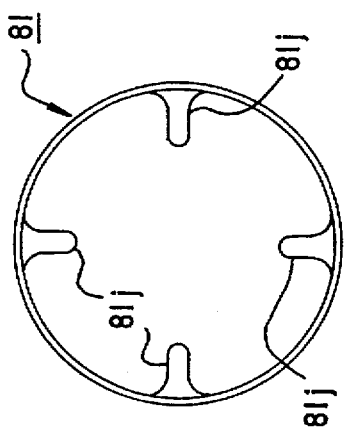
FIG.9(C)
FIG.9(D)
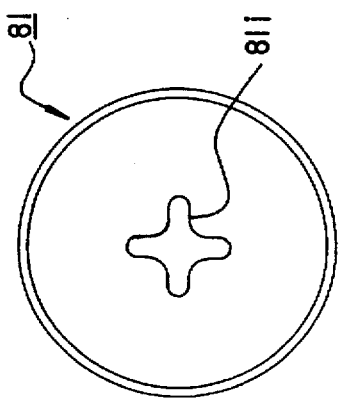
FIG.9(A)
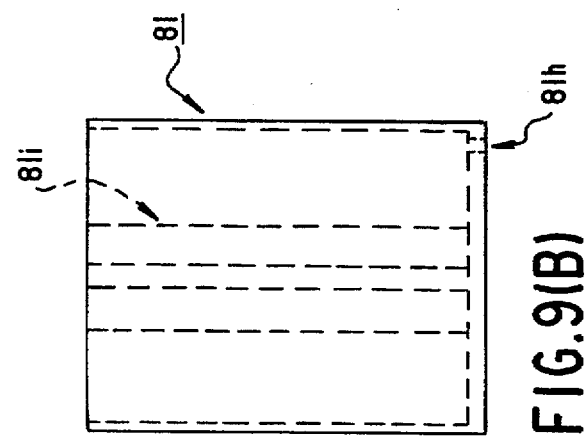
FIG.9(B)

STERILIZING METHOD, APPARATUS AND CONTAINER OF SOLID MATTER OR LIQUID MATTER CONTAINING SOLID MATTER

TECHNICAL FIELD

The present invention relates to a sterilizing method, apparatus and container of solid matter or liquid matter containing solid matter for use in, for example, preliminary sterilization in a prior stage of retort food.

BACKGROUND ART

Generally, retort food is prepared by mixing unsterilized food materials, such as solid matter and liquid matter, putting in a bag or the like of plastics or aluminum, sealing, applying in a retort apparatus, and heating and processing to sterilize.

In the conventional sterilizing method, since solid matter and liquid matter are heated and processed simultaneously by passing through a sealed bag or the like, processing suited to solid matter and processing suited to liquid matter cannot be done separately, and the processing time tends to be long, ranging from scores of minutes to several hours, and it took a longer time when the thickness of the bag was larger. Accordingly, the food was exposed to high temperature for a long time, which led to problems of deterioration of quality and decline of flavor.

Moreover, when sterilizing solid matter only, hitherto, a large volume was put in a large pressure vessel to sterilize for a long time, and uneven processing and overcooking were likely to occur, or it required weighing or dispensing to distribute into bags after processing, which was often accompanied by deformation, and yet drip or juice exuding from the solid matter at the time of sterilization process remained in the bottom of the pressure vessel, and it was extremely difficult to put it into the bag together with the solid matter, and the drip containing taste components was discarded as waste liquid.

DISCLOSURE OF THE INVENTION

The invention is proposed in the light of the above problems, and it is hence an object thereof to present a sterilizing method and apparatus of solid matter or liquid matter containing solid matter capable of sterilizing and processing efficiently in a short time, while preventing deterioration of quality or decline of flavor.

It is also an object of the invention to present a container suitable for use with such sterilizing method and apparatus.

To achieve the objects, the invention provides a method in which solid matter and liquid matter are heated and sterilized separately, and they are mixed after being sterilized to put into bag or container, and sealed tightly.

In this way, by separately heating and sterilizing the solid matter and liquid matter, mixing them after sterilizing, putting into bag or container, and sealing, the solid matter and liquid matter can be sterilized and processed in an appropriate method each efficiently in a short time. As a result, deterioration of quality and decline of flavor can be prevented, but rather the flavor may be enhanced, and retort food of high quality may be presented.

Also according to the method of the invention, when heating and sterilizing the solid matter independently, the solid matter is weighed and dispensed in each retainer for the portion of one pack, and sterilized, and after being sterilized, it is transferred from the retainer into the bag or container, and sealed tightly.

Thus, when heating and sterilizing the solid matter independently, by weighing and dispensing the solid matter in each retainer for the portion of one pack, and sterilizing, and transferring, after sterilizing, from the retainer into the bag or container, and sealing tightly, the solid matter can be sterilized uniformly in a short time, and the processing time is further shortened, so that the retort food of high quality may be presented, and moreover the job of filling with solid matter after sterilizing is easy, and the drip exuding from the solid matter at the time of sterilization process can be put into the bag or container together with the solid matter.

In a method of the invention, moreover, it is intended to sterilize while rotating the retainer when weighing the solid matter in the retainer for the portion of one pack each and sterilized in dispensed portions.

As a result, the solid matter in the retainer is stirred, and it is possible to sterilized uniformly in a short time.

A method of the invention is further intended to sterilize and process sequentially in plural stages while rotating the retainer in the sterilizing processing tank partitioned into plural processing compartments in the sequence of processes, when sterilizing while rotating the retainer by weighing the solid matter in the retainer for the portion of one pack each and dispensing in divided portions.

Hence, the cycle time of batch processing can be shortened.

A method of the invention is to process by retort or process by refrigerating or freezing, after putting and sealing the sterilized solid matter in a bag or container.

By thus processing by retort or processing by refrigerating or freezing after packing and sealing in a bag or container, in the case of retort processing, the retort sterilizing conditions can be lessened because of preliminary sterilizing, so that the quality may be enhanced. In the case of processing by refrigerating or freezing, the number of initial bacteria can be decreased by preliminary sterilizing, so that the quality and safety may be enhanced.

The method of the invention is applied to the solid matter only. Hence, it is easy to pack in the bag or container after sterilizing process, and the drip exuding from the solid matter at the time of sterilization is contained in the retainer together with the solid matter, so that it can be put into the bag or container together with the solid matter.

The solid matter, after being heated and sterilized in the retainer disposed for the portion of one pack each, and packed and sealed in the bag or container from the retainer, may be directly distributed as product, or distributed after retort processing or processing by refrigerating or freezing. Anyway, because of preliminary sterilizing, the quality and safety may be enhanced.

It is preferred to treat in vacuum before and after heating and sterilizing. As a result, efficient heating and cooling can be done.

An apparatus of the invention comprises cylindrical retainers with an open top and a closed bottom for accommodating solid matter by dispensing in the portion of one pack each, a sterilizing tank for sterilizing the solid matter contained in the retainers, by receiving and supporting, and also discharging the retainers aligned between inlet and outlet, so as to be free to roll and rotate with the opening upward, valves installed at the inlet and outlet of the sterilizing tank, and an oscillating device for oscillating the sterilizing tank up and down like a seesaw.

By oscillating the sterilizing tank up and down like a seesaw by the oscillating device, the retainers move in the sterilizing tank while rolling from higher position to lower position, and by repeating this operation alternately, the retainers can be rotated alternately in opposite directions in a simple constitution, and stopping shock is given every time, so that the agitating action may be enhanced.

In the apparatus of the invention, in order to sterilize solid matter sequentially, the sterilizing tank is partitioned into plural treating compartments in the process sequence, and valves are installed at the inlet and outlet of the sterilizing tank, and between the plural partitioned treating compartments.

By thus partitioning the sterilizing tank in plural treating compartments in the process sequence and sterilizing in plural stages, each process can be executed in parallel, and the cycle time of batch processing can be shortened. The plural treating compartments are an evacuating and heating compartment, a heating and sterilizing compartment, and a vacuum cooling compartment.

In the apparatus of the invention, one end of the sterilizing tank is a closed end and the other end is an open end, and a valve is installed at the open end so as to serve as both inlet and outlet, and the retainer extruding device is commonly used as the discharge device.

In this way, the structure is simplified.

Also in the apparatus of the invention, an inlet is formed above one end of the sterilizing tank so that the retainer can be passed downward in an upright position, and an outlet is installed below the other end so that the retainer can be passed downward in an upright position, and therefore the retainer is sent in downward from above the inlet of the sterilizing tank, and the retainer is sent out downward from beneath the outlet of the sterilizing tank.

Thus, charging and discharging of retainers in the sterilizing tank can be done by gravity, making use of the slope action, so that particular driving device may be omitted.

In the apparatus of the invention, the retainers are supported by a plurality of guide rails disposed parallel along the longitudinal direction of the treating tank in this sterilizing tank, so as to be free to roll and rotating in a state inclined by a slight angle to the lateral direction orthogonal to the aligning direction.

In this manner, the moving action of the retainers from high position to low position by oscillation of the sterilizing tank can be securely transformed into the action for rotating the retainers by the frictional force between the guide rails and retainers.

Also in the apparatus of the invention, end pipes are disposed at positions corresponding to the plural retainers accommodated in the sterilizing tank, and steam is directly blown to the solid matter in the retainers through the end pipes.

Hence, the solid matter in the retainers can be sterilized in a further shorter time.

The apparatus of the invention is further intended to sterilize by heating, and evacuate the sterilizing tank before and after heating. Thus, the solid matter can be heated and cooled efficiently.

The container of the invention, that is, the retainer for accommodating the solid matter has the inner shape formed in a circular, polygonal, or protruding form.

In this constitution, when rotating the retainer, the solid matter contained in the retainer can be agitated securely. As a result, the solid matter in the retainer is sequentially rolled to expose the entire surface so as to receive sterilizing action efficiently in a short time.

The container of the invention has the outer circumference formed in a cylindrical form, the bottom is closed, the top is open, and the inner wall surface is cylindrical or polygonal, and one or a plurality of protrusions of same or different heights are provided on each side of the inner wall of the container.

The container of the invention has the outer circumference formed in a cylindrical form, the bottom is closed, the top is open, and the inner wall surface is cylindrical or polygonal, and one or a plurality of protrusions of same or different heights are provided on each side of the inner wall of the container.

The container of the invention has the outer circumference formed in a cylindrical form, the bottom is closed, the top is open, and the inner wall surface is cylindrical or polygonal, and one or a plurality of agitating members raised from the bottom are provided in the space in the container.

The container of the invention has the outer circumference formed in a cylindrical form, the bottom is closed, the top is open, and the inner wall surface is cylindrical or polygonal, and one or a plurality of longitudinal grooves of same or different depths are provided on each side of the inner wall of the container, and one or a plurality of protrusions of same or different heights are provided on each side of the inner wall of the container so as to be matched with the longitudinal grooves.

The container of the invention has the outer circumference formed in a cylindrical form, the bottom is closed, the top is open, and the inner wall surface is cylindrical or polygonal, and one or a plurality of longitudinal grooves of same or different depths are provided on each side of the inner wall of the container, one or a plurality of protrusions of same or different heights are provided on each side of the inner wall of the container so as to be matched with the longitudinal grooves, and moreover one or a plurality of agitating members raised from the bottom are provided in the space of the container.

The container of the invention has the outer circumference formed in a cylindrical form, the bottom is closed, the top is open, and the inner wall surface is cylindrical or polygonal, and one or a plurality of longitudinal grooves of same or different depths are provided on each side of the inner wall of the container, and one or a plurality of agitating members raised from the bottom are provided in the space of the container.

The container of the invention has the outer circumference formed in a cylindrical form, the bottom is closed, the top is open, and the inner wall surface is cylindrical or polygonal, and one or a plurality of protrusions of same or different heights are provided on each side of the inner wall of the container, and one or a plurality of agitating members raised from the bottom are provided in the space of the container.

The container of the invention has the inner wall formed in a slope gradually decreasing in the opening area from the upper part toward the lower part.

The container of the invention has the peripheral wall provided with one or a plurality of vent holes or meshes penetrating inside and outside.

The container of the invention has the inner bottom formed in a plane, slope, concave sphere, concave cone, concave pyramid, convex cone, convex pyramid, or convex sphere.

The container of the invention has one or a plurality of holes provided in the bottom.

The container of the invention has a plurality of protrusions of same or different heights formed in the inner bottom.

The container of the invention has the agitating members formed so that the sectional area may increase gradually from the upper end toward the lower end.

The container of the invention has a louver with one or a plurality of holes disposed on the inner bottom at a slight distance from the bottom.

The container of the invention is made of a material which withstands high temperature and is permitted according to the Food Sanitation Law, for example, polymethyl pentene, other plastics, and metals.

In the container of the invention, since the outer circumference is a cylindrical form, the container can be rotated by rolling by making use of the slope. The inner wall of the container may be cylindrical, but when formed in an angular form, the rolling direction of the object of processing can be changed, and mixing can be improved. In the case of angular form, since the triangle is small in inner volume, a polygon of quadrangle or more angles may be preferred. On the wall of each side, by forming longitudinal grooves or protrusions in the longitudinal direction, an agitating action can be given to the object to be treated, mixing is improved, and uniform sterilizing is achieved in a short time. Besides, when one or a plurality of agitating members are planted from the bottom in the space of the container, the action may be further enhanced. In particular, the central part of the container, as compared with the outer periphery, rotating action is less likely to occur, and the agitating members set up in this portion may play the role of separators, so that the agitating actin of the object of treatment may be improved.

The shape of the inner bottom of the container may be a plane, but when formed in a slope, concave sphere, concave cone, concave pyramid, convex cone, convex pyramid, or convex sphere, the agitating action can be given to the object of treatment, and the mixing may be improved.

When protrusions are formed in the inner bottom of the container, deposit of the object of treatment on the bottom of the container may be less. Moreover, when protrusions or louvers are provided in the inner bottom of the container, the exuding drip may be separated and collected in the bottom of the container, so that partially uneven sterilization due to contact with the drip can be avoided, and moreover after sterilizing and cooking, this drip can be collected and put together in the bag or container. If not necessary to collect the drip, meanwhile, holes may be formed in the bottom of the container. By forming ventilation holes or meshes in the peripheral wall of the container, steam or the like may easily invade into the content in the container from outside, so that the sterilizing and cooking efficiency may be enhanced.

The material of the container is plastics such as polymethyl pentene, or metals, that withstand high temperature and are permitted in the Food Sanitation Law, so that it can be easily formed in a complicated internal shape.

BRIEF DESCRIPTION OF THE DRAWINGS

FIG. 3 (A), (B) are schematic plan and schematic side view showing a constitution of a first embodiment of the apparatus of the invention.

FIG. 6 (A) is a schematic plan view showing a constitution of a third embodiment of the apparatus of the invention, (B) is its schematic side view, and FIG. 7 is a schematic side view of an oscillating device of the sterilizing tank in the third embodiment.

BEST MODE OF CARRYING OUT THE INVENTION

Figure 1:
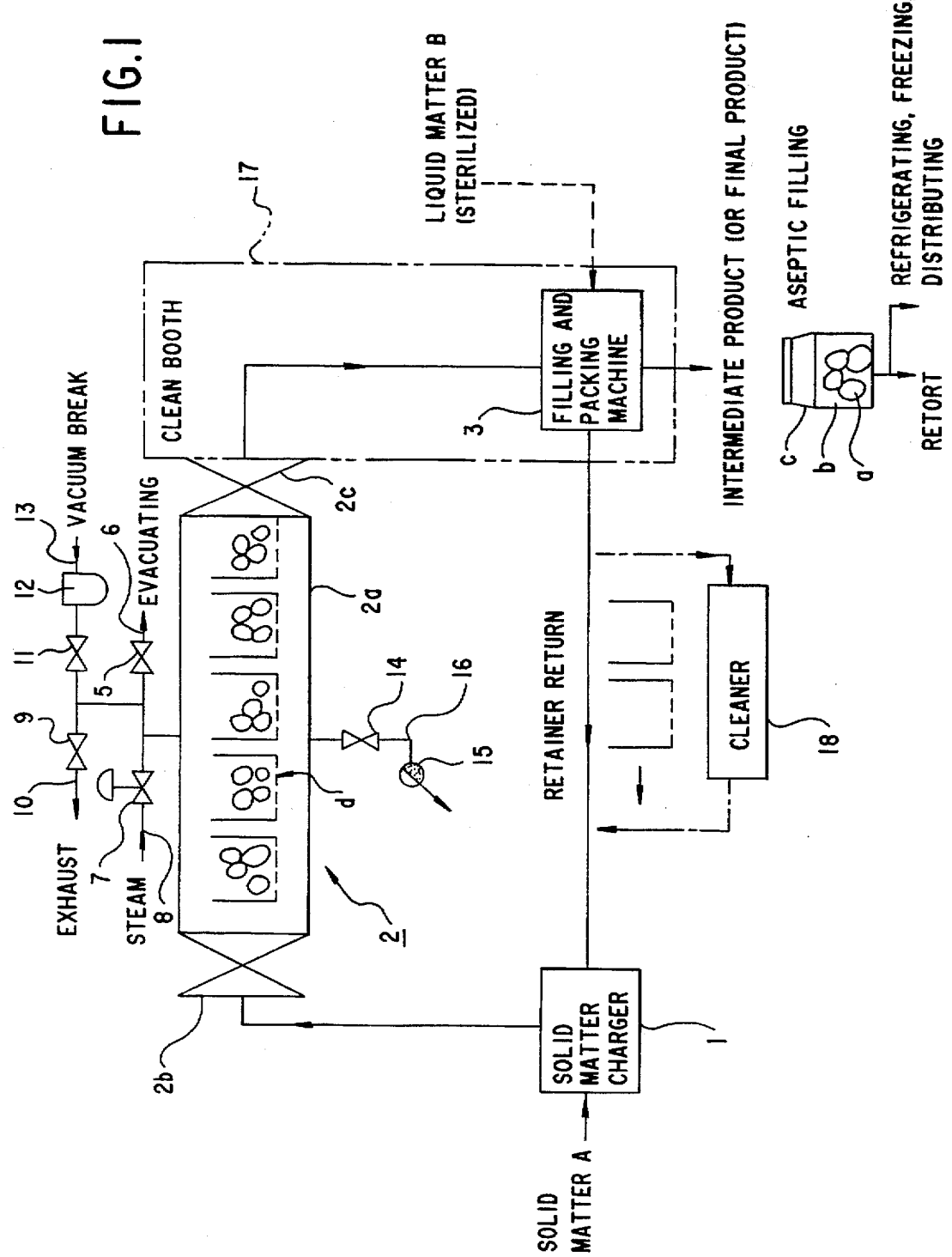
FIG. 1 is a schematic explanatory diagram showing a constitution of an embodiment of the invention.

According to the invention, as shown in FIG. 1, solid matter (a) is put into a sterilizer main body 2 from a solid matter charger 1, and the solid matter (a) is sterilized in the sterilizer main body 2, and is taken out, after being sterilized, from the sterilizer main body 2, and put into a bag (c) together with liquid matter (b) sterilized separately, by means of filling and packing machine 3, and is sealed and taken out as an intermediate product or final product, and then processed by retort or processed by refrigerating or freezing.

The solid matter (a) charged into the sterilizer main body 2 is preliminarily weight, dispensed and distributed in each retainer (d) for the portion of one pack, and is put into the sterilizer main body 2 from the solid matter charger 1 in this state. This retainer (d) is made of heat resistant plastics or metal, and is formed in a cup shape opened in the upper part.

The solid matter charger 1 is for sequentially charging the solid matter (a) contained in the retainer (d) into the sterilizer main body 2, and it may be realized by any known system, such as conveyor system and pusher system.

The sterilizer main body 2 is mainly composed of a cylindrical or columnar slender pressure vessel 2a having a pressure resistance, and an inlet valve 2b and an outlet valve 2c are provided at both ends of the pressure vessel 2a. As the inlet valve 2b and outlet valve 2c, valves of various types may be employed, such as ball valve type and slide valve type. When charging the solid matter (a) contained in the retainer (d) into the sterilizer main body 2 by the solid matter charger 1, the inlet valve 2b is opened, or when taking out the solid matter (a) contained in the retainer (d) from the sterilizer main body 2, the outlet valve 2c is opened. When sterilizing the solid matter (a) contained in the retainer (d) in the pressure vessel 2a of the sterilizer main body 2, the inlet valve 2b and outlet valve 2c are closed in an airtight state.

Inside of the pressure vessel 2a, the solid matter (a) contained in the retainers (d) is arranged in a row tightly, and is sterilized and discharged. As the means of sterilizing process, the pressure vessel 2a comprises a reducing valve 5, a reducing pipe 6 connected to a vacuum pump (not shown), a steam feed valve 7, a steam feed pipe 8 connected to a steam source (not shown), an exhaust valve 9, an exhaust pipe 10 released to the atmosphere, a vacuum break valve 11, an atmospheric lead-in pipe 13 for leading in the atmosphere through a filter 12, and a drain pipe 16 provided with a drain valve 14 and a trap 15.

The filling and packing machine 3 transfers the sterilized solid matter (a) discharged from the outlet valve 2c of the sterilizer main body 2 as being contained in the retainer (d) into the bag (c) from the retainer (d) to fill up, and the liquid matter (b) sterilized separately from the solid matter (a) is also put into the bag (c), which is sealed to be sent out as an intermediate product or final product, and afterwards it is processed by retort, or processed by refrigerating or freezing. This filling and packing machine 3 is installed in a clean booth 17 together with the outlet valve 2c of the sterilizer main body 2.

The retainer (d) becoming empty after transferring the solid matter (a) into the bag (c) by means of the filling and packing machine 3 is recovered and returned to the solid matter charger 1 side, and is used again. In this case, depending on the degree of contamination of the retainer (d), it may be used again after cleaning by passing through a cleaner 18.

Figure 2:
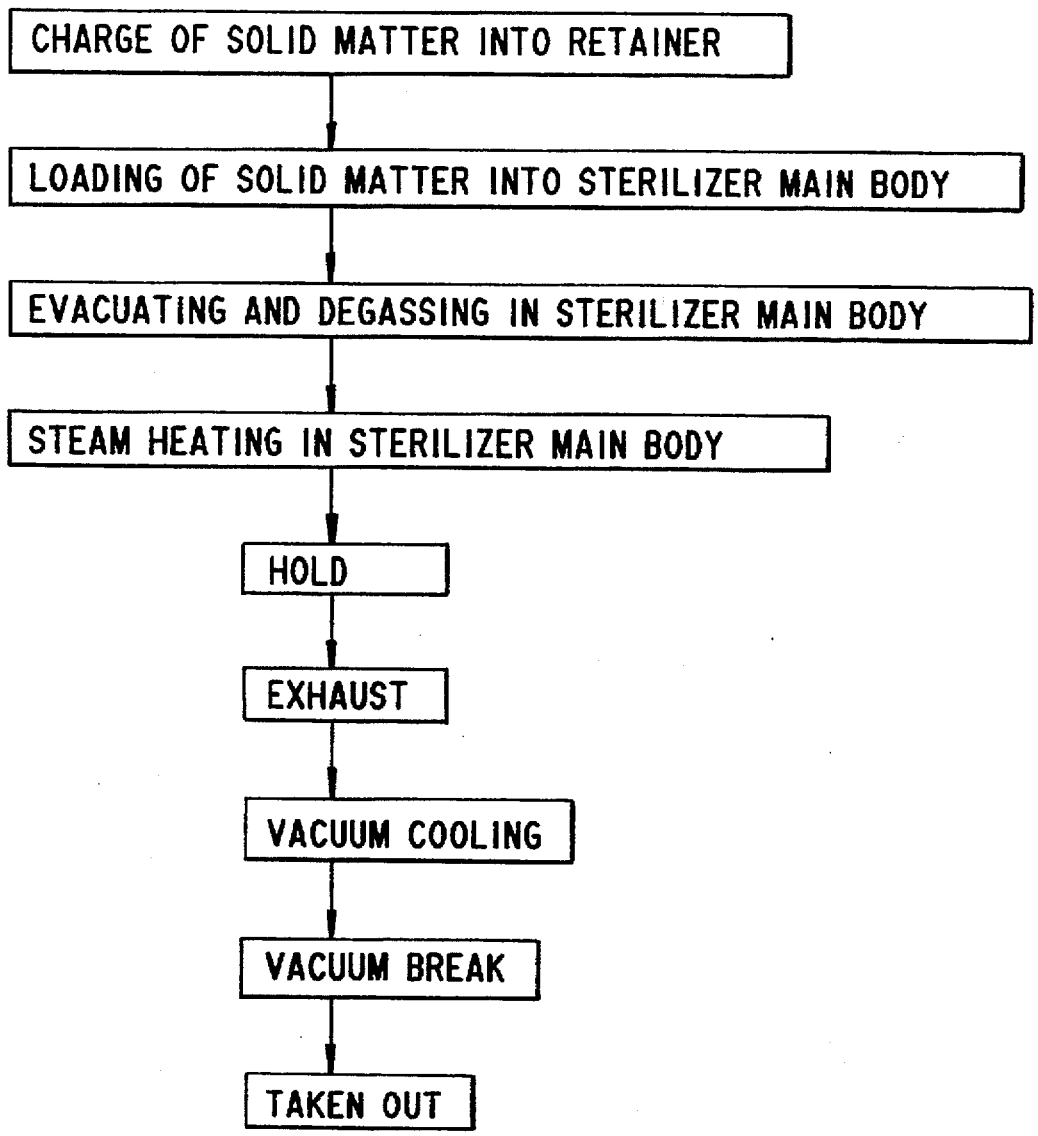
FIG. 2 is a process explanatory diagram of the invention.
Figure 4A:
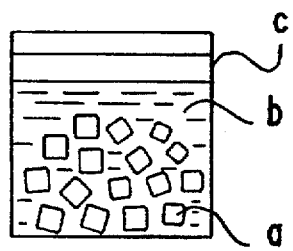
FIG. 4 (A) is a schematic side view of merchandise to be treated by the invention, (B) is a schematic perspective view of retainer, (C) is a front view of a solid matter extruding device, (D) is a longitudinal front view showing an example of a sterilizing tank, FIG. 5 (A) is a schematic side view showing an example of oscillating device of a sterilizing tank in the invention, and (B) is a schematic longitudinal sectional view showing a second embodiment of the apparatus of the invention.
Figure 4B:
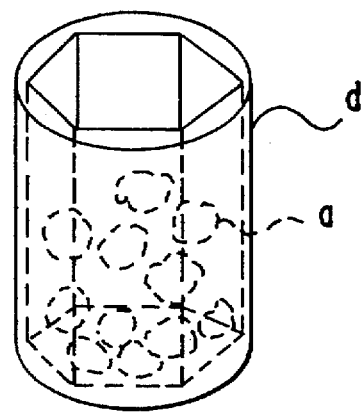
Figure 4C:
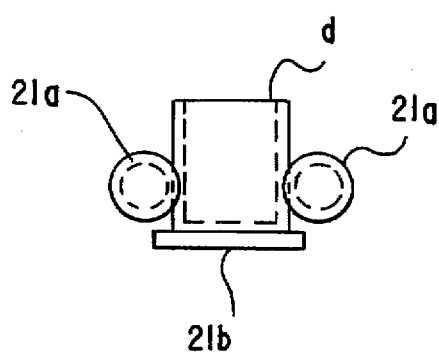
Figure 4D:
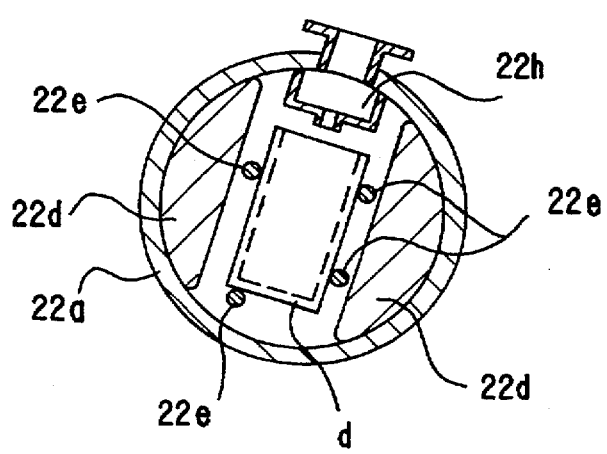

The embodiment of the invention is thus constituted, and the entire operation is described by referring to the process diagram in FIG. 2. First, the solid matter (a) is charged into the retainer (d) by the portion of one pack each. The retainers (d) containing the solid matter (a) are sequentially charged into the pressure vessel 2a of the sterilizer main body 2 by the solid matter charger 1, sequentially by a specified number by opening the inlet valve 2b. After filling, the inlet valve 2b is closed, while, of course, the outlet valve 2c is closed from the beginning. In this state, only the reducing valve 5 is opened, while other valves 7, 9, 11, 14 are closed. By driving the vacuum pump (not shown), the pressure vessel 2a is evacuated and degassed. After evacuating and degassing, the reducing valve 5 is closed, and only the steam feed valve 7 is opened. From the steam feed source (not shown) through the steam feed pipe 8, steam (saturated steam) is injected into the pressure vessel 2a to raise the temperature. In this case, the steam volume injected into the pressure vessel 2a is adjusted by the steam feed valve 7, and a specific temperature is held for a specific time (for example, 133° C., 30 to 600 sec). Thus, the solid matter (a) contained in each retainer (d) is heated and sterilized uniformly. In this way, by evacuating in the pressure vessel 2a and injecting steam, foams in the texture of the solid matter (a) such as vegetable are degassed, and deformation in the process of heating and sterilizing can be prevented, while the boiling point of the moisture content is lowered, and sterilization is achieved in a short time, and heat damage of the solid matter (a) may be lessened.

After holding the specific temperature in the pressure vessel 2a for a specific time, the exhaust valve 9 is opened, and the steam in the pressure vessel 2a is discharged to return to the atmospheric pressure. Afterwards, the steam valve 9 is closed, the reducing valve 5 is opened again to evacuate the pressure vessel 2a by vacuum pump, thereby evacuating and cooling the solid matter (a) to a proper temperature at a proper speed (for example, cooling from 100° C. to ordinary temperature). After cooling, the reducing valve 5 is closed, the vacuum break valve 11 is opened, and the atmosphere sterilized by the filter 12 is led into the pressure vessel 2a from the atmospheric lead-in pipe 13. Afterwards, the outlet valve 2c is opened, and the sterilized solid matter (a) is taken out into the clean booth 17 together with the retainer (d), and is put into the bag (c), together with the liquid matter (b) sterilized separately, by the filling and packing machine 3, and is sealed. Later, the retainers (d) are used again. What is taken out from the filling and packing machine 3 is obtained as intermediate product or final product, and the intermediate product is processed by retort or processed by refrigerating or freezing. Inside the pressure vessel 2a, the next solid matter (a) is charged and filled in the same manner and sterilized and taken out. This operation is repeated thereafter, and the solid matter (1) is put in the retainer (d) by the portion of one pack each, and is sterilized in batch process in the pressure vessel 2a of the sterilizer main body 2 by every specific number of pieces.

The embodiment relates to an example of filling and sealing the bag (c) with solid matter (a) and liquid matter (b), but the invention may be also applied in the example of filling and sealing the bag (c) with solid matter (a) only.

The inlet valve 2b and outlet valve 2c are provided at both ends of the pressure vessel 2a, but a valve may be provided at one end only and the other end may be closed, and the solid matter (a) may be put in and taken out from the valve end. Instead of the bag (c), a tray or other container used in retort package may be also used.

The constitution of the first embodiment of the invention is described below by referring to FIG. 3 (A), (B). The apparatus of the invention is intended to fill a sterilizing tank 22 with solid matter (a) by means of a solid matter extruder 21, sterilize the solid matter (a) in the sterilizing tank 22, discharge from the sterilizing tank 22 after sterilizing by means of a discharge unit 23, put into the bag (c) together with liquid matter (b) sterilized separately by means of a filling and packing machine 24, seal, and take out as intermediate product or final product, and process by retort or process by refrigerating or freezing.

The solid matter (a) to be charged in the sterilizing tank 22 is weighed, dispensed and distributed into each retainer (d) for one pack preliminarily as shown in FIG. 4 (B), and is charged into the sterilizing tank 22 by the solid matter extruder 21 in this state as shown in FIG. 3. This retainer (d) is made of heat resistant plastics or metal, and in a cup form with an open top having a bottom, with the outer circumference in a cylindrical form and the inner circumference in a polygonal form. Instead of polygonal form, it may be in a circular form or protrusions may be formed in the circular inner circumference.

The solid matter extruder 21 is for sequentially charging the solid matter (a) contained in the retainer (d) in the sterilizing tank 22, and in the illustrated example, each retainer (d) is held from both sides by a pair of screw conveyors 21a, 21a from both sides and moved on a support plate 21b, but other constitution, such as known method of belt conveyor system or pusher system may be also employed.

The sterilizing tank 22 is mainly composed of a slender pressure vessel 22a of cylindrical or polygonal tubular form of pressure resistance, and an inlet valve 22b and an outlet valve 22c are provided at both ends of the pressure vessel 22a. The inlet valve 22b and outlet valve 22c show an example of ball valve type, and are automatically opened and closed by switching devices 22b', 22c' such as air cylinders. However, slide valve type and valve of other types may be also employed. When the solid matter (a) contained in the retainer (d) is put into the sterilizing tank 22 by the slid matter extruder 21, the inlet valve 22b is opened, and when taking out the solid matter (a) contained in the retainer (d) from the sterilizing tank 22, the outlet valve 22c is opened. When sterilizing the solid matter (a) contained in the retainer (d) in the pressure vessel 22a of the sterilizing tank 22, the inlet valve 22b and outlet valve 22c are closed in airtight state.

The inside of the pressure vessel 22a is constituted so as to receive the solid matter (a) contained in the retainer (d) tightly in a row, and sterilize and discharge. The pressure vessel 22a is, as most explicitly shown in FIG. 4 (D), made of stainless steel or other corrosion resistant metal in a cylindrical form which is advantageous for pressure resistance, and at both inner sides, dead spacers 22d, 22d are installed over the entire length so as to minimize the space. Moreover, to support the retainer (d) in a rolling and rotating state at a slight inclination from the upright position over the entire length of the pressure vessel 22a, a plurality of (at least four) guide rails 22e . . . are disposed parallel. The guide rails 22e . . . are round bars, and rolling rotation is facilitated by minimizing the frictional area on the retainer (d), and in order to support stably, upper and lower pieces are disposed on the side of the slope lower side of the retainer (d), one is disposed in the upper part of the side of the slope upper side, and one piece is disposed in the bottom shifted to the slope upper side. Reference numeral 22h is a pressure distribution compartment formed in the inner upper part of the pressure vessel 22a.

As the means of sterilizing process, the pressure vessel 22a is provided with a pressure regulating valve 26, and a solenoid valve 27 as shown in FIG. 3 (B), and it further comprises a reducing piping 28, a feed rate regulating valve 29, a solenoid valve 30 connected to a vacuum pump (not shown), a steam feed piping 31 and a solenoid valve connected to a steam source (not shown), and they are connected through exhaust and atmospheric lead-in pipe 33 for releasing to the atmosphere, and flexible pipes 34 . . . , and moreover a drain pipe 37 having a drain valve 35 and a trap 36 is connected.

The discharge device 23, in the illustrated example, shows a belt conveyor, but other constitution, such as the screw conveyor same as the solid matter extruder 21 may be also employed.

The filling and packing machine 24 is designed to transfer the sterilized solid matter (a) discharged in a state being contained in the retainer (d) by the discharge device 23 from the outlet valve 22c of the sterilizing tank 22 from the retainer (d) into the bag (c), put the liquid matter (b) sterilized separately from the solid matter (a) also into the bag (c), seal, and send out as intermediate product or final product, and it is afterwards processed by retort or processed by refrigerating or freezing. This filling and packing machine 24 is installed in the clean booth (aseptic room) together with the outlet valve 22c of the sterilizing tank 22.

The retainer (d) becoming empty after transferring the solid matter (a) into the bag (c) by means of the filling and packing machine 24 is recollected and returned to the solid matter extruder 21 side, and used again. In this case, depending on the degree of contamination of the retainer (d), it may be reused after cleaning by passing through a cleaner.

Figure 5A:
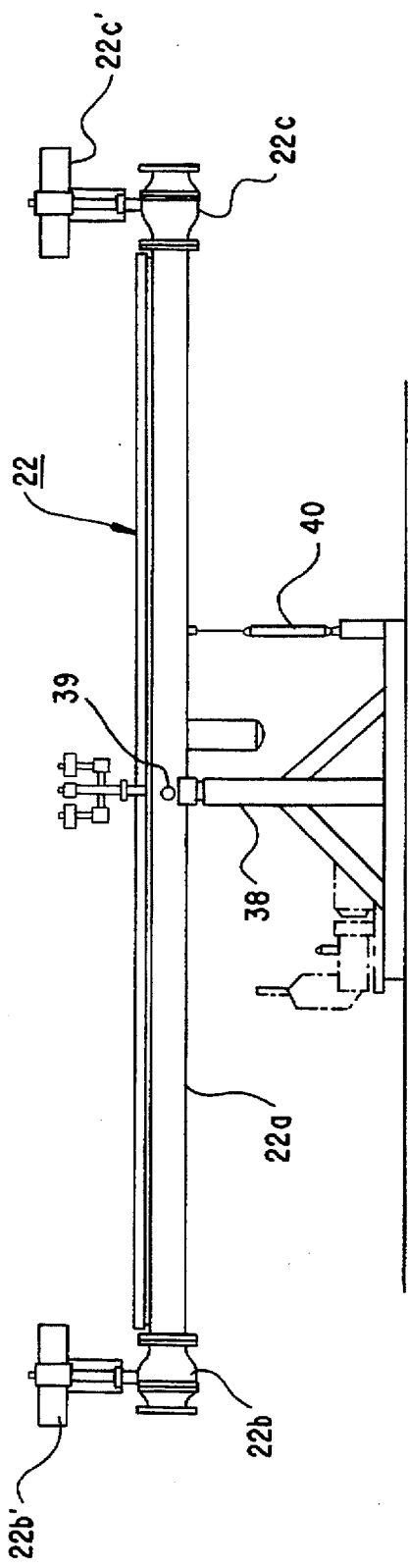
Figure 5B:
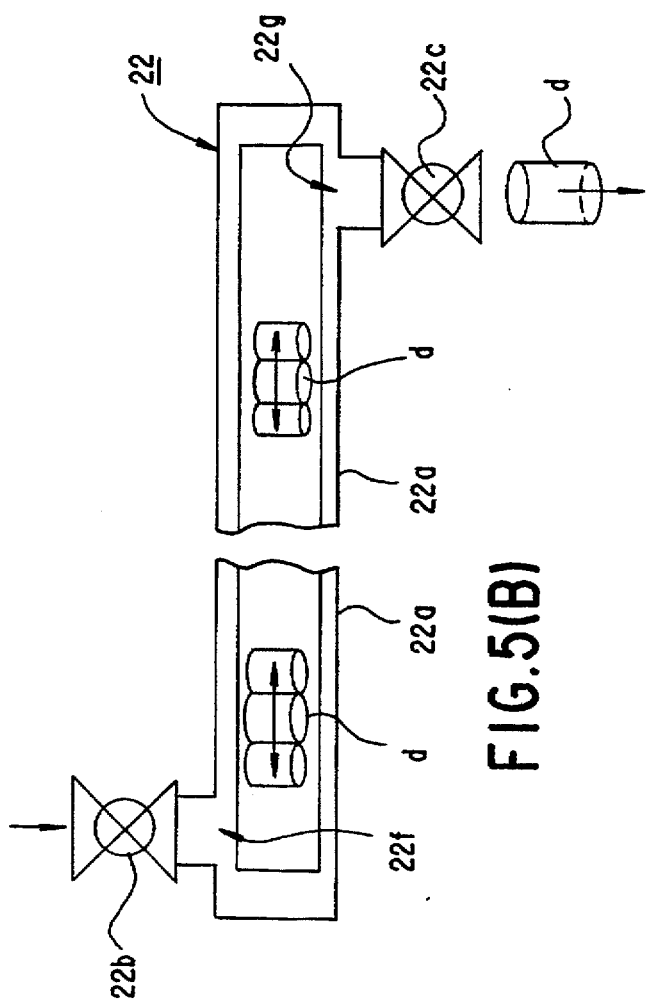

The pressure vessel 22a of the sterilizing tank 22 has its middle part supported, as shown in FIG. 5 (A), by a fulcrum shaft 39 of a post 38 so as to be oscillatable vertically like a seesaw, and is oscillated vertically in an angle range of 10 to 20° to the horizontal direction by means of an oscillating device 40. This oscillating device 40 is shown as an air cylinder, but other constitution may be also applied.

The embodiment of the invention is thus constituted, and the entire operation is described. First, the solid matter (a) is dispensed into each retainer (d) for the portion of one pack. In this case, it is preferred to dispense by weighing. The retainer (d) filled with solid matter (a) is charged into the pressure vessel 22a of the sterilizing tank 22 by the solid matter extruder 21 by opening the inlet valve 22b sequentially by a desired number of pieces. In this case, instead of packing the pressure vessel 22a fully with the retainers (d), a free space for several, for example, five pieces is left over. After filling, the inlet valve 22b is closed, while, of course, the outlet valve 22c has been closed from the beginning. In this state, the solenoid valve 27 of the reducing piping 28 is opened, and a vacuum pump (not shown) is driven and the pressure vessel 22a is evacuated and degassed (preferably over −700 mmHgG). After evacuating and degassing, the solenoid valve 27 of the reducing piping 28 is closed, and the solenoid valve 30 of the steam feed piping 31 is opened, and steam (saturated steam) is injected into the pressure vessel 22a from the steam source (not shown) to raise the temperature. In this case, the steam feed rate to be injected into the pressure vessel 22a is adjusted by the feed rate regulating valve 29, and is held at a specific temperature for a specific time (for example, 2 kg/cm$^2$, 133° C., 30 to 600 sec). In this way, the solid matter (a) contained in the retainers (d) is uniformly heated and sterilized. By thus evacuating the pressure vessel 22a and injecting steam, bubbles in the texture of solid matter (a) such as vegetable are degassed, and deformation in the process of temperature rise and sterilization may be prevented, while the boiling temperature of moisture contained in the solid matter (a) is lowered, and sterilization is achieved in a short time, so that heat damage of the solid matter (a) may be alleviated. In this period, the pressure vessel 22a is slowly oscillated up and down like a seesaw by means of the oscillating device 40. For example, it is oscillated for 3 to 5 minutes at a pitch of 30 to 60 seconds. By this oscillation, the retainers (d) move reciprocally in the pressure vessel 22a while rolling on the guide rails 22e, . . . for the portion of the provided free space from the higher position to the lower position, and this operation is repeated alternately. That is, the retainers (d) alternately repeat clockwise rotation and counterclockwise rotation, and receive stopping shock every time, and the solid matter (a) inside is mixed and stirred by the polygonal internal surface, and the whole circumference contacts with heated steam sequentially so as to be sterilized uniformly.

After holding in the pressure vessel 22a at specific temperature for specific time, the solenoid valve 32 of the exhaust and atmospheric lead-in pipe 33 is opened, and the steam in the pressure vessel 22a is discharged to return to the atmospheric pressure. Afterwards, closing the solenoid valve 32 of the exhaust and atmospheric lead-in pipe 33, the solenoid valve 27 of the reducing valve 38 is opened again and the pressure vessel 22a is evacuated by the vacuum pump, so that the solid matter (a) is evacuated and cooled to an appropriate temperature at a proper rate (for example, cooling from 100° C. to ordinary temperature). After cooling, the solenoid valve 27 of the reducing valve 28 is closed, and the solenoid valve 32 of the exhaust and atmospheric lead-in pipe 33 is opened, and the atmosphere sterilized by a filter (not shown) is introduced into the pressure vessel 22a. Afterwards, opening the outlet valve 22c, the sterilized solid matter (a) is taken out and put into the clean booth together with the retainer (d), and is put into the bag (c) together with the liquid matter (b) sterilized separately and sealed by means of the filling and packing machine 24. The retainers (d) are used again later. What is taken out of the filling and packing machine 24 is obtained as intermediate product or final product, and the intermediate product is processed by retort, or processed by refrigerating or freezing. In the pressure vessel 22a, next solid matter (a) is charged, sterilized, and taken out in the same manner. By repeating this operation thereafter, the solid matter (a) is sterilized in batch process in the pressure vessels 22a of the sterilizing tank 22 by a specified number of pieces each in the state being contained in the retainers (d) for the portion of one pack each.

The embodiment is an example of filling and packing the bag (c) with solid matter (a) and liquid matter (b), but the invention may be also applied to a case of filling and packing the bag (c) with solid matter (a) only.

The inlet valve 22b and outlet valve 22c are provided at both ends of the pressure vessel 22a, but a valve may be provided at one end only and the other end may be closed, and the solid matter (a) may be put in and taken out from the valve end. Instead of the bag (c), a tray or other container used in retort package may be also used. Inside the pressure vessel 22a, retainers (d) containing the solid matter (a) may be charged in plural rows.

Moreover, end pipes may be provided at positions relative to plural retainers (d) put in the sterilizing tank 22, and steam can be directly sprayed to the solid matter (a) in the retainers (d) through these end pipes, so that sterilization may be done in a short time.

FIG. 5 (B) shows other embodiment of the apparatus of the invention, in which an inlet 22f is formed above one end of the sterilizing tank 22 so as to pass the retainer (d) downward in an upright position, an outlet 22g is formed below the other end so as to pass the retainer (d) downward in an upright position, and the retainer (d) is sent in from above the inlet 22f of the sterilizing tank 22 so as to fall by its own gravity, and the retainer (d) is sent out from below the outlet 22g of the sterilizing tank 22 so s to fall by its own gravity similarly. In this embodiment, when ball valves are used in the inlet valve 22b and outlet valve 22c, the opening shape of the ball valves may be circular, and the entire ball valve may be smaller in size.

A constitution of a third embodiment of the apparatus of the invention is explained by referring to the embodiments shown in FIG. 6 (A) and (B).

The third embodiment of the apparatus of the invention is intended to, as shown in FIG. 6, put solid matter (a) into a sterilizing tank 42 by means of a solid matter extruder 41, sterilize the solid matter (a) in the sterilizing tank 42, discharge, after sterilizing, from the sterilizing tank 42 by means of a discharge device 43, and put into a bag (c), together with liquid matter (b) sterilized separately, by means of a filling and packing machine 44, seal and take out as intermediate product or final product, and process by retort or process by refrigerating or freezing.

The solid matter (a) to be charged in the sterilizing tank 42 is weighed, dispensed and distributed into each retainer (d) for one pack preliminarily as shown in FIG. 4 (B), and is charged into the sterilizing tank 42 by the solid matter extruder 41 in this state as shown in FIG. 6. This retainer (d) is made of heat resistant plastics or metal, and in a cup form with an open top having a bottom, with the outer circumference in a cylindrical form and the inner circumference in a polygonal form. Instead of polygonal form, it may be in a circular form or protrusions may be formed in the circular inner circumference.

The solid matter extruder 41 is for sequentially charging the solid matter (a) contained in the retainer (d) in the sterilizing tank 42, and in the illustrated example, each retainer (d) is held from both sides by a pair of screw conveyors 41a, 41a from both sides and moved on a support plate 41b, but other constitution, such as known method of belt conveyor system or pusher system may be also employed.

The sterilizing tank 42 is partitioned into plural processing compartments in the process sequence in order to shorten the cycle time of batch process. In this embodiment, it is partitioned into a vacuum up and heating compartment (or vacuum pre-heating compartment) 42a, a sterilizing compartment (or pre-heating compartment) 42b, and a vacuum cooling compartment 42c. The vacuum pre-heating compartment 42a, sterilizing compartment 42b, and vacuum cooling compartment 42c are composed in a slender pressure vessel of pressure resistance in a cylindrical or polygonal cylindrical form, and inlet valve 42d, outlet valve 42e, and intermediate sluice valves 42f, 42g are provided at both ends of the sterilizing tank 42 and between processing compartments. The inlet valve 42d, outlet valve 42e, and intermediate sluice valves 42f, 42g are ball valves in this example, and they are automatically opened and closed by air cylinders or other switching devices 42d', 42e', 42f', 42g'. However, slide valves and other valves of various types may be similarly used. When putting the solid matter (a) contained in the retainer (d) into the vacuum pre-heating compartment 42a of the sterilizing tank 42 by means of the solid matter extruder 41, the inlet valve 42d is opened, when transferring the solid matter (a) contained in the retainer (d) from the vacuum pre-heating compartment 42a into the sterilizing compartment 42b, the sluice valve 42f is opened, when transferring the solid matter (a) contained in the retainer (d) from the sterilizing compartment 42b into the vacuum cooling compartment 42c, the sluice valve 42g is opened, and when taking out the solid matter (a) contained in the retainer (d) from the vacuum cooling compartment 42c, the outlet valve 42e is opened. When processing the solid matter (a) contained in the retainer (d) in the processing compartments of the sterilizing tank 42, the valves 42d to 42g are closed in airtight state.

Inside of the vacuum pre-heating compartment 42a, the solid matter (a) contained in the retainers (d) is received in a row tightly, and is evacuated and heated, and discharged into the sterilizing compartment 42b. The structure of the vacuum pre-heating compartment 42a is same as the structure shown in FIG. 4 (D) relating to the first embodiment. The sterilizing compartment 42b and vacuum cooling compartment 42c are similarly structured.

The vacuum pre-heating compartment 42a comprises, as shown in FIG. 6 (B), a pressure regulating valve and a solenoid valve 47, a reducing piping 48, a feed rate adjusting valve 49 and a solenoid valve 50 connected to a vacuum pump (not shown), and a steam feed piping 51 and a solenoid valve 52 connected to a steam source (not shown), and an exhaust and atmospheric lead-in pipe 53 for releasing to the atmosphere is connected through a flexible piping 54. The sterilizing compartment 42b comprises a feed rate adjusting valve 55 and a solenoid valve 56, and a steam feed pipe 57 and a solenoid valve 58 connected to a steam source (not shown), and an exhaust and atmospheric lead-in pipe 59 is connected through a flexible piping 60. The vacuum cooling compartment 42c comprises a pressure regulating valve 61 and a solenoid valve 62, and a reducing piping 63 and a solenoid valve 64 connected to a vacuum pump (not shown), and an atmospheric lead-in piping 65 releasing to the atmosphere is connected through a flexible piping 66. In each processing compartment, a drain piping 69 comprising a drain valve 67 and a trap 68 is connected.

The discharge device 43 is a belt conveyor in the shown example, but other constitution may be employed, for example, a screw conveyor same as the solid matter extruder 41.

The filling and packing machine 44 is designed to transfer the sterilized solid matter (a) discharged in a state being contained in the retainer (d) by the discharge device 43 from the outlet valve 42e of the sterilizing tank 42 from the retainer (d) into the bag (c), put the liquid matter (b) sterilized separately from the solid matter (a) also into the bag (c), seal, and send out as intermediate product or final product, and it is afterwards processed by retort or processed by refrigerating or freezing. This filling and packing machine 44 is installed in the clean booth (aseptic room) together with the outlet valve 42e of the sterilizing tank 42.

The retainer (d) becoming empty after transferring the solid matter (a) into the bag (c) by means of the filling and packing machine 44 is recollected and returned to the solid matter extruder 41 side, and used again. In this case, depending on the degree of contamination of the retainer (d), it may be reused after cleaning by passing through a cleaner.

The sterilizing tank 42 has its middle part supported, as shown in FIG. 7, by a fulcrum shaft 71 of a post 70 so as to be oscillatable vertically like a seesaw, and is oscillated vertically in an angle range of 10 to 20° to the horizontal direction by means of an oscillating device 72. This oscillating device 72 is shown as an air cylinder, but other constitution may be also applied.

The third embodiment of the invention is thus constituted, and the entire operation is described. First, the solid matter (a) is dispensed into each retainer (d) for the portion of one pack. The retainer (d) filled with solid matter (a) is charged into the vacuum pre-heating compartment (or pre-heating compartment) 42a of the sterilizing tank 42 by the solid matter extruder 41 by opening the inlet valve 42d sequentially by a desired number of pieces. In this case, instead of packing the vacuum pre-heating compartment 42a fully with the retainers (d), a free space for several, for example, three pieces is left over. After filling, the inlet valve 42d is closed, while the sluice valves 42f, 42g and outlet valve 42e are closed. In this state, the solenoid valve 47 of the reducing piping 48 is opened, and a vacuum pump (not shown) is driven and the vacuum up and heating compartment 42a is evacuated and degassed (preferably over −700 mmHgG). After evacuating and degassing, the solenoid valve 47 of the reducing piping 48 is closed, and the solenoid valve 50 of the steam feed piping 51 is opened, and steam (saturated steam) is injected into the vacuum up and heating compartment 42a from the steam source (not shown) to raise the temperature. In this case, the steam feed rate to be injected into the vacuum pre-heating compartment 42a is adjusted by the feed rate regulating valve 49. Afterwards, opening the sluice valve 42f, the sterilizing tank 42 is inclined by the oscillating device 72, and the solid matter (a) in the vacuum pre-heating compartment 42a is moved into the sterilizing compartment 42b together with the retainers (d). After moving, the sterilizing tank 42 is returned to the horizontal position, and the sluice valve 42f is closed, and the retainers (d) containing next solid matter (a) are put into the vacuum pre-heating compartment 42a. In the sterilizing compartment 42b, opening the solenoid valve 56, saturated steam is supplied into the sterilizing compartment 42b from the steam feed piping 57, and is held at a specific temperature for a specific time (for example, 2 kg/cm$^2$, 133° C., 30 to 600 sec). In this way, the solid matter (a) contained in the retainers (d) is uniformly heated and sterilized. By thus evacuating the sterilizing compartment 42b and injecting steam, bubbles in the texture of solid matter (a) such as vegetable are degassed, and deformation in the process of temperature rise and sterilization may be prevented, while the boiling temperature of moisture contained in the solid matter (a) is lowered, and sterilization is achieved in a short time, so that heat damage of the solid matter (a) may be alleviated. In this period, the sterilizing tank 42 is slowly oscillated up and down like a seesaw by means of the oscillating device 72. For example, it is oscillated for 3 to 5 minutes at a pitch of 30 to 60 seconds. By this oscillation, the retainers (d) move reciprocally in the processing compartments of the sterilizing tank 42 while rolling on the guide rails for the portion of the provided free space from the higher position to the lower position, and this operation is repeated alternately. That is, the retainers (d) alternately repeat clockwise rotation and counterclockwise rotation, and receive stopping shock every time, and the solid matter (a) inside is mixed and stirred by the polygonal internal surface, and the whole circumference contacts with heated steam sequentially so as to be sterilized uniformly.

After holding in the sterilizing compartment 42b at specific temperature for specific time, the solenoid valve 58 is opened, and the steam in the sterilizing compartment 42b is discharged through the exhaust and atmospheric lead-in pipe 59 to introduce the atmosphere, and the sluice valve 42g is opened, and the sterilizing tank 42 is inclined by the oscillating device 72, and the solid matter (a) in the sterilizing compartment 42b is moved into the vacuum cooling compartment 42c together with the retainers (d). After moving, the sterilizing tank 42 is returned to the horizontal position, and the sluice valve 42g is closed. Consequently, opening the solenoid valve 62, the vacuum cooling compartment 42c is evacuated and degassed through the reducing piping 63 by the vacuum pump. As a result, the solid matter (a) is evacuated and cooled to an appropriate temperature at a proper rate (for example, cooling from 100° C. to ordinary temperature). After cooling, the solenoid valve 62 of the reducing valve 63 is closed, and the solenoid valve 64 of the atmospheric lead-in pipe 65 is opened, and the atmosphere sterilized by a filter (not shown) is introduced into the vacuum cooling compartment 42c. Afterwards, opening the outlet valve 42e, and inclining the sterilizing tank 42 by the oscillating device 72, the sterilized solid matter (a) is taken out together with the retainer (d) and discharged into the clean booth by means of the discharge device 43, and is put into the bag (c) together with the liquid matter (b) sterilized separately and sealed by means of the filling and packing machine 44. The retainers (d) are used again later. What is taken out of the filling and packing machine 44 is obtained as intermediate product or final product, and the intermediate product is processed by retort, or processed by refrigerating or freezing. In the vacuum pre-heating compartment 42a, next solid matter (a) is charged, sterilized, and taken out in the same manner. By repeating this operation thereafter, the solid matter (a) is sterilized in batch process in the processing compartments of the sterilizing tank 42 by a specified number of pieces each in the state being contained in the retainers (d) for the portion of one pack each. The number of retainers (d) in each processing compartment is not full, but there is a free space for allowing to roll and rotate, and therefore the moving period of the retainers (d) in the processing compartments may be simultaneously, and it is designed to discharge sequentially from the forward position, that is, the vacuum cooling compartment 42c.

The third embodiment is an example of filling and packing the bag (c) with solid matter (a) and liquid matter (b), but the invention may be also applied to a case of filling and packing the bag (c) with solid matter (a) only. In each processing compartment of the sterilizing tank 42, the retainers (d) containing the solid matter (a) may be arranged in plural rows.

Moreover, end pipes may be provided at positions relative to plural retainers (d) put in the sterilizing tank 42, and steam can be directly sprayed to the solid matter (a) in the retainers (d) through these end pipes, so that sterilization may be done in a short time.

The constitution of the container of the invention is described below by referring to embodiments shown in FIG. 8 to FIG. 13.

Figure 8A:
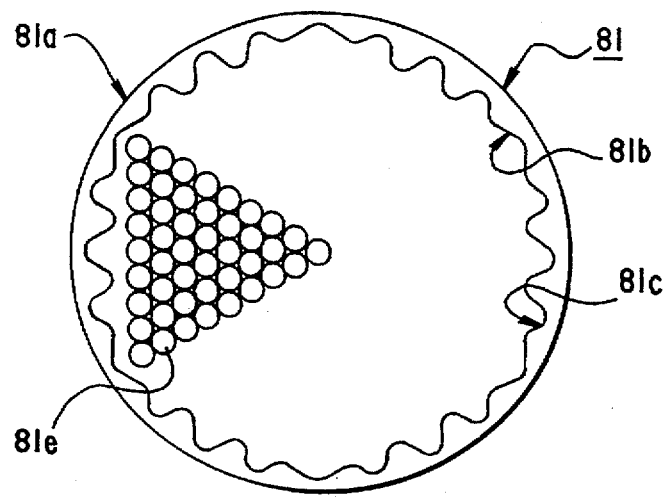
FIG. 8 (A) is a plan view showing a first embodiment of the container of the invention, (B) is its side view, FIG. 9 (A) is a plan view showing a second embodiment of the container of the invention, (B) is its side view, (C) is a plan view showing a third embodiment of the container of the invention, (D) is its side view, (E) is a plan view showing a fourth embodiment of the container of the invention, (F) is its side view, and FIG. 10 (A) to (F) show variations of plane shape of the inner wall of the container of the invention.
Figure 8B:
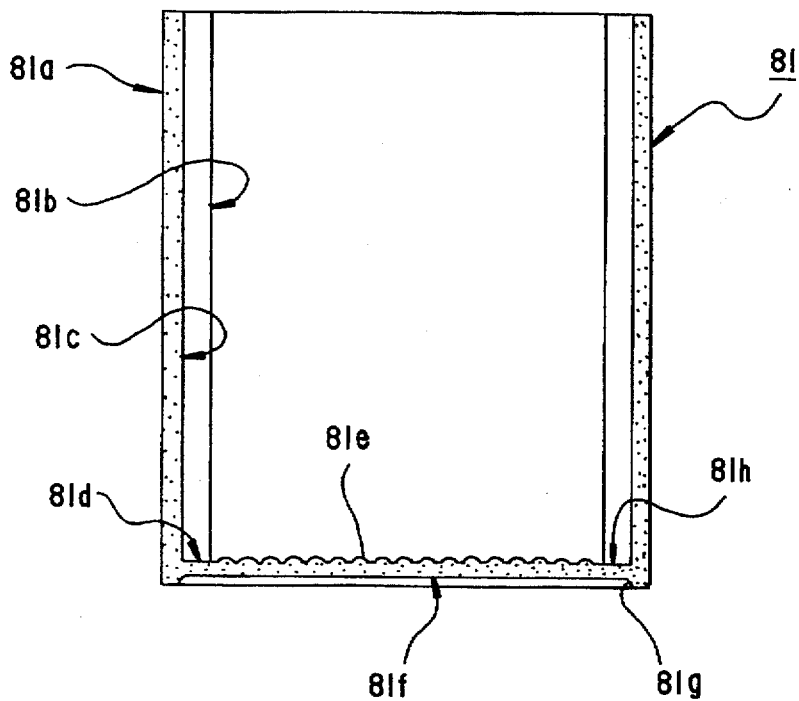
Figure 10A:
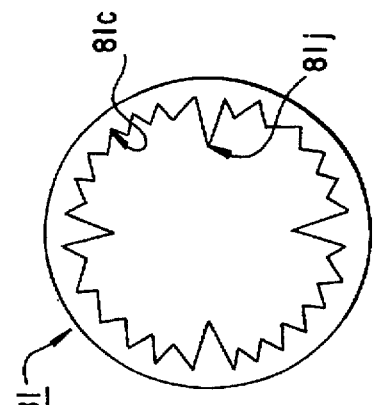
Figure 10B:
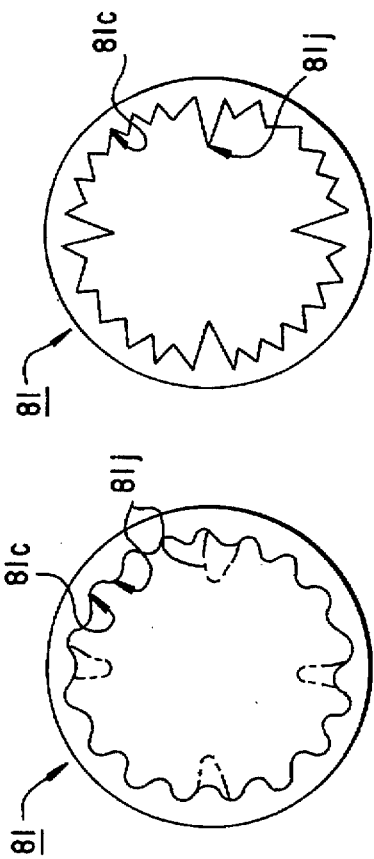
Figure 10C:
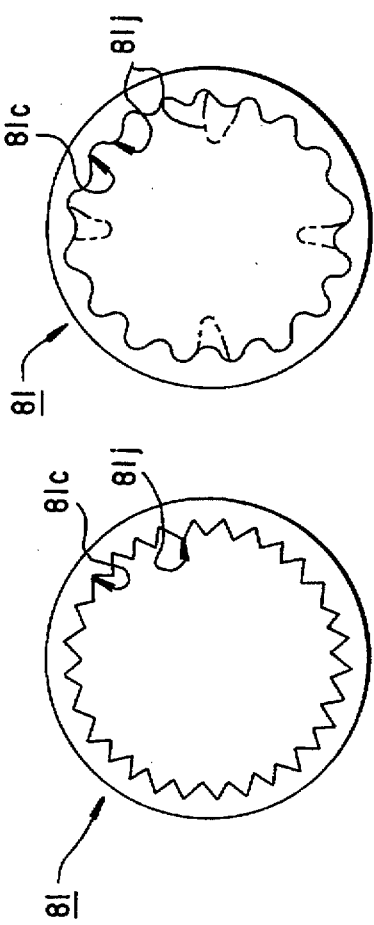
Figure 10D:
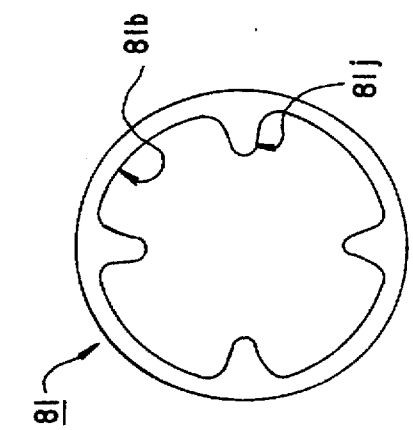
Figure 10E:
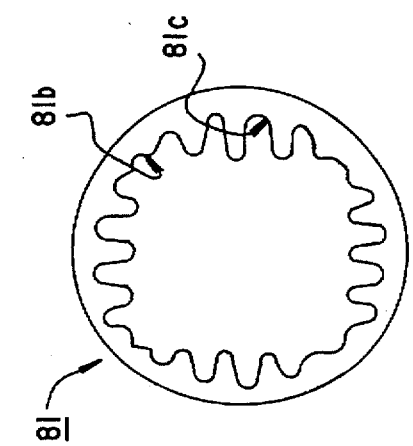
Figure 10F:
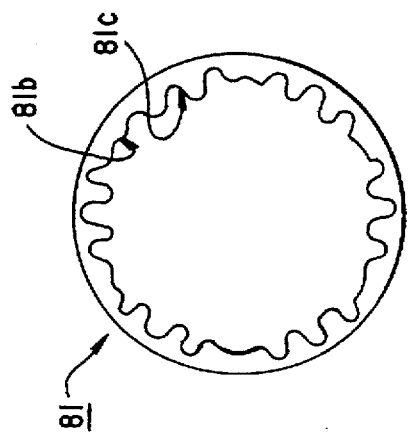

First, a container 81 in FIG. 8 has its outer circumference 81a made in a cylindrical form, the plane shape of its inner wall 81b is hexagonal, three longitudinal grooves 81c are formed in each side, the inner wall 81b is a slope gradually decreasing in the opening area from the upper part to the lower part, its inner bottom 81d is a flat plane, protrusions 81e of same height are formed in this flat inner bottom 81d, a flange 81g is provided around its outer bottom 81f so as to decrease the contact area with guide rails when rolling and rotting the container by making us of the slope mentioned later, and a tiny hole 81h is formed to penetrate through from the inner bottom 81d to the outer bottom 81f. The material of the container 81 may plastics such as polymethyl pentene or metals which withstand high temperature and are permitted by the Food Sanitation Law, and complicated internal shapes can be formed easily, which is very preferable. In the case of metals, it is easy to manufacture by casting (precision casting or the like) by using aluminum alloy or the like. Of course, using other metals, it may be manufactured by machining or the like.

In a container 81 shown in FIG. 9 (A), (B), a cross agitating member 81i is planted in the middle, and its inner wall 81b is in a cylindrical form. In a container 81 in FIG. 9 (C), (D), the inner wall 81b is in a cylindrical form, and a protrusion 81j in the longitudinal direction is disposed in the inner wall 81b one each at four positions at equal intervals on the circumference. In a container 81 in FIG. 9 (E), (F), a louver 81k with legs is disposed on the inner bottom 81d at a slight distance. This louver 81k is made of corrosion resistant metal plate such as stainless steel of the same material as the container 81, and tiny holes 81k' are provided appropriately.

FIG. 10 (A) to (F) show variation examples of plane shape of the inner wall of the container 81 of the invention, in which triangular longitudinal grooves 81c or longitudinal protrusions 81j are formed in the cylindrical inner circumference in (A), waveform longitudinal grooves 81c or longitudinal protrusions 81j are formed in the cylindrical inner circumference by partly varying in depth or height in (B), part of (A) is varied in depth or height in (C), the plane shape of the inner wall 81b of the container 81 is hexagonal, and waveform longitudinal grooves 81c or longitudinal protrusions 81j are formed in each side in (D), waveform longitudinal grooves 81c or longitudinal protrusions 81j are formed in each side of quadrangle in (E), and longitudinal protrusions 81j are formed at four positions in equal distribution positions on the circumference of the cylindrical inner circumference in (F). The plane shape of the inner wall of the container 81 may be their combination or other shape. These longitudinal grooves 81c or longitudinal protrusions 81j are intended to promote agitation action by rolling of the object to be processed and improve the mixing. These shapes may be properly selected in consideration of the properties and characteristics of the material to be processed.

Figure 11A:
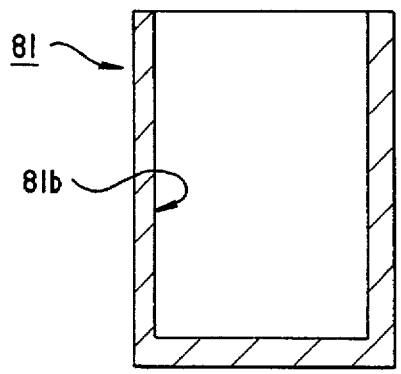
FIG. 11 (A),(B) show modified examples of the shape as seen from the longitudinal side of the inner wall of the container.
Figure 11B:
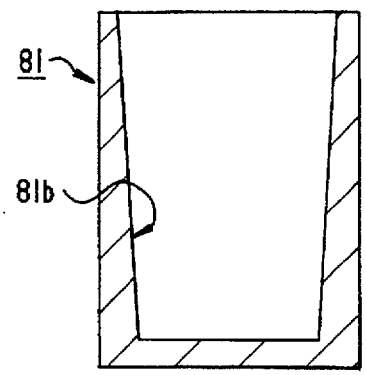
Figure 12A:
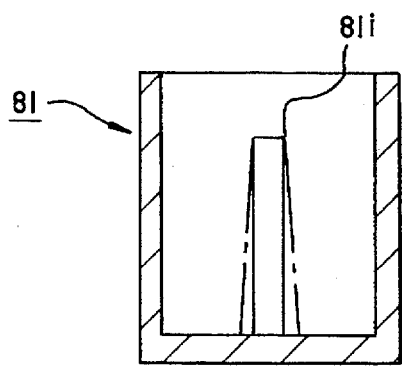
FIG. 12 (A) to (E) are variation explanatory diagram of agitating members planted from the inner bottom in the inner space of the container.
Figure 12B:
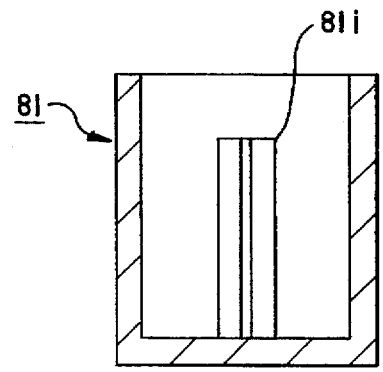
Figure 12C:
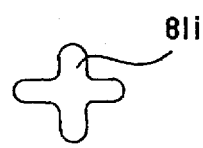
Figure 12E:
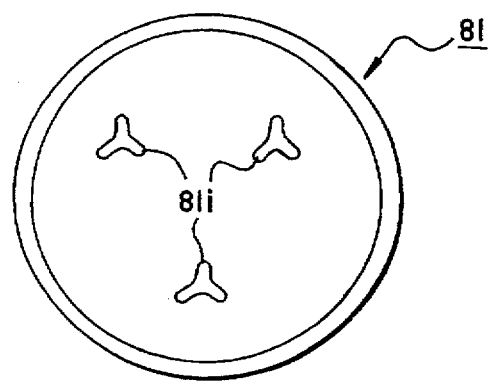
Figure 12D:
Figure 13A:
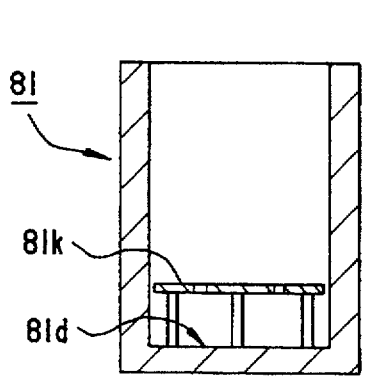
FIG. 13 (A) to (H) are variation explanatory diagrams of the inner bottom of the container.
Figure 13B:
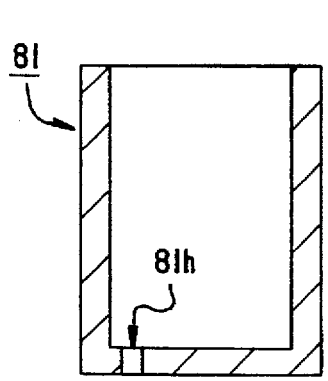
Figure 13C:
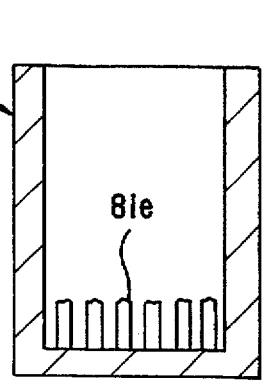
Figure 13D:
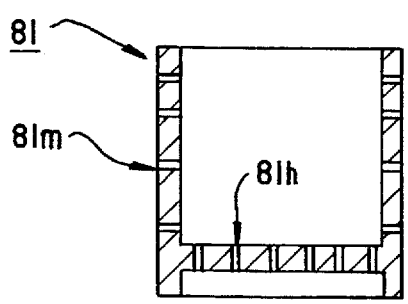
Figure 13E:
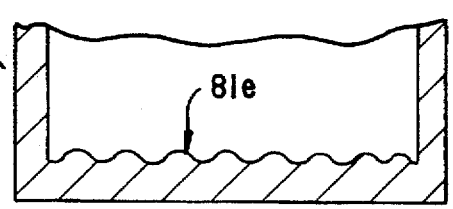
Figure 13F:
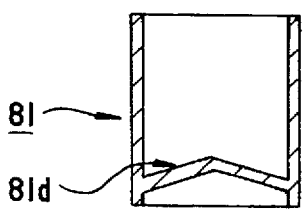
Figure 13G:
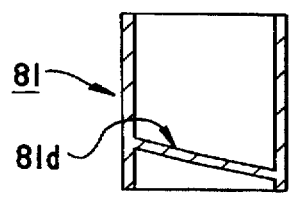
Figure 13H:
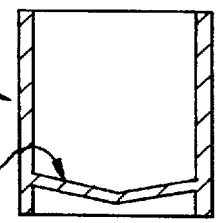

FIG. 11 (A) and (B) show modified examples of the shape as seen from the longitudinal section of the inner wall 81b of the container 81, in which (A) shows the straight type, and (B) shows the taper type decreasing in the opening area from the upper part to the lower part, and the latter is easier to prevent remaining when discharging the processed material from the container 81.

FIG. 12 (A) to (E) are variation explanatory diagrams of agitation member 81i set up from the inner bottom 81d in the inner space of the container 81, in which (A) is case of setting up one circular agitation member 81i in the middle of the container 81, (B) is a case of setting up one cross agitation member 81i in the middle of the container 81, (C) is a case of cross shape of the plane shape of the agitation member 81i, (D) is a case of three-vane shape of the plane shape of the agitation member 81i, and (E) is a case of setting up three agitation members 81i, which is suited to a large-sized container 81. In this agitation member 81i, the sectional area may be gradually increased downward as indicated by chain line in FIG. 12 (A). The position of installation may be deviated from the middle of the container 81, or the number of pieces is arbitrary.

FIG. 13 (A) to (H) are variation explanatory diagrams of the inner bottom 81d of the container 81, in which (A) is a case of installing a louver 81k, (B) is a case of forming tiny holes 81h, (C) is a case of forming protrusions 81e, (D) is a case of forming a plurality of holes 81h in the inner bottom 812d and a plurality of vent holes 81m in the peripheral wall, (E) is a case of forming waveform protrusions 81e in the inner bottom 81d, (F) is a case of forming a convex cone, (G) is a case of forming a slope, and 9H) is a case of forming a concave cone. Besides, concave sphere, convex sphere, and other shapes may be properly employed for improving the mixture of the materials, decreasing the deposit residue, facilitating drip separation, and other requests. Incidentally, when forming vent holes 81m in the peripheral wall, meshes may be also employed, and this constitution eliminates excess drip, and encourages flow of heated steam from the surrounding.

The illustrated embodiments may be not only executed independently, but also executed in combination.

Such container 81 is used in the method and apparatus of sterilizing, and is applied in sterilization and cooking of solid matter. In the embodiments, the container of the invention has been explained as the one used for sterilizing and cooking, but it may be also used in other applications, such as rotary drying or ordinary drying process by feeding the food after processing into the drying process.

We claim:

1. A sterilizing method of liquid matter containing solid matter, wherein solid matter is weighed, dispensed and distributed in a retainer for the portion of one pack each, and sterilized while rotating the retainer, and, after being sterilized, this solid matter is mixed with liquid matter sterilized separately from the retainer, and put into a bag or container, and sealed.

2. A sterilizing method of liquid matter containing solid matter, wherein solid matter is weighed, dispensed and distributed in a retainer for the portion of one pack each, and sterilized sequentially in plural stages while rotating the retainer in a sterilizing tank partitioned into plural processing compartments in the process sequence, and, after being sterilized, this solid matter is mixed with liquid matter sterilized separately from the retainer, and put into a bag or container, and sealed.

3. A sterilizing method of claim 1 or 2, wherein sterilization is executed by heating, and vacuum process is done before and after heating.

4. A sterilizing apparatus of solid matter comprising cylindrical retainers with an open top and a closed bottom for accommodating solid matter by dispensing in the portion of one pack each, a sterilizing tank for sterilizing the solid matter contained in the retainers, by receiving and supporting, and also discharging the retainers aligned between inlet and outlet, so as to be free to roll and rotate with the opening upward, valves installed at the inlet and outlet of the sterilizing tank, and an oscillating device for oscillating the sterilizing tank up and down like a seesaw.

5. A sterilizing apparatus of solid matter of claim 4, wherein one end of the sterilizing tank is a closed end and the other end is an open end, and a valve is installed at the open end so as to serve as both inlet and outlet, and the retainer extruding device is commonly used as the discharge device.

6. A sterilizing apparatus of solid matter of claim 4, wherein an inlet is formed above one end of the sterilizing tank so that the retainer can be passed downward in an upright position, and an outlet is installed below the other end so that the retainer can be passed downward in an upright position, and therefore the retainer is sent in downward from above the inlet of the sterilizing tank, and the retainer is sent out downward from beneath the outlet of the sterilizing tank.

7. A sterilizing apparatus of solid matter comprising cylindrical retainers with an open top and a closed bottom for accommodating solid matter by dispensing in the portion of one pack each, a sterilizing tank partitioned in plural processing compartments in the process sequence for sequentially sterilizing the solid matter contained in the retainers, by receiving and supporting, and also discharging the retainers aligned between inlet and outlet, so as to be free to roll and rotate with the opening upward, valves installed at the inlet and outlet of the sterilizing tank and between the plural partitioned processing compartments, and an oscillating device for oscillating the sterilizing tank up and down like a seesaw.

8. A sterilizing apparatus of solid matter of claim 7, wherein the plural partitioned processing compartments of the sterilizing tank are three compartments, that is, a vacuum up and heating compartment, heating sterilizing compartment, and vacuum cooling compartment.

9. A sterilizing apparatus of solid matter of any one of claims 4 to 8, wherein the retainers are supported by a plurality of guide rails disposed parallel along the longitudinal direction of the processing tank in the sterilizing tank, being free to roll and rotate in a state slightly inclined in a lateral direction orthogonal to the alignment direction.

10. A sterilizing apparatus of solid matter of any one of claims 4 to 8, wherein the inner circumferential shape of the retainers is circular, polygonal or protruding.

11. A sterilizing apparatus of solid matter of any one of claims 4 to 8, wherein end pipes are disposed at positions corresponding to the plural retainers accommodated in the sterilizing tank, and steam is directly blown to the solid matter in the retainers through the end pipes.

12. A sterilizing apparatus of solid matter of any one of claims 4 to 8, wherein sterilization is executed by heating, and vacuum process is done before and after heating.

13. A container for sterilizing and cooking is a container used in sterilizing and cooking the material contained inside by rolling and rotating by making use of a slope in a sterilizing tank, wherein the outer circumference is formed in a cylindrical form, the bottom is closed, the top is open, and the inner wall surface is cylindrical or polygonal, and one or a plurality of longitudinal grooves of same or different depths are provided on each side of the inner wall of the container.

14. A container for sterilizing and cooking is a container used in sterilizing and cooking the material contained inside by rolling and rotating by making use of a slope in a sterilizing tank, wherein the outer circumference is formed in a cylindrical form, the bottom is closed, the top is open, and the inner wall surface is cylindrical or polygonal, and one or a plurality of longitudinal protrusions of same or different heights are provided on each side of the inner wall of the container.

15. A container for sterilizing and cooking is a container used in sterilizing and cooking the material contained inside by rolling and rotating by making use of a slope in a sterilizing tank, wherein the outer circumference is formed in a cylindrical form, the bottom is closed, the top is open, and the inner wall surface is cylindrical or polygonal, and one or a plurality of agitation members raised from the bottom are provided in the space of the container.

16. A container for sterilizing and cooking is a container used in sterilizing and cooking the material contained inside by rolling and rotating by making use of a slope in a sterilizing tank, wherein the outer circumference is formed in a cylindrical form, the bottom is closed, the top is open, and the inner wall surface is cylindrical or polygonal, one or a plurality of longitudinal grooves of same or different depths are provided on each side of the inner wall of the container, and one or a plurality of longitudinal protrusions of same or different heights are provided on each side of the inner wall of the container to be combined with the longitudinal grooves.

17. A container for sterilizing and cooking is a container used in sterilizing and cooking the material contained inside by rolling and rotating by making use of a slope in a sterilizing tank, wherein the outer circumference is formed in a cylindrical form, the bottom is closed, the top is open, and the inner wall surface is cylindrical or polygonal, one or a plurality of longitudinal grooves of same or different depths are provided on each side of the inner wall of the container, and one or a plurality of longitudinal protrusions of same or different heights are provided on each side of the inner wall of the container to be combined with the longitudinal grooves, and moreover one or a plurality of agitation members raised from the bottom are provided in the space of the container.

18. A container for sterilizing and cooking is a container used in sterilizing and cooking the material contained inside by rolling and rotating by making use of a slope in a sterilizing tank, wherein the outer circumference is formed in a cylindrical form, the bottom is closed, the top is open, and the inner wall surface is cylindrical or polygonal, one or a plurality of longitudinal grooves of same or different depths are provided on each side of the inner wall of the container, and one or a plurality of agitation members raised from the bottom are provided in the space of the container.

19. A container for sterilizing and cooking is a container used in sterilizing and cooking the material contained inside by rolling and rotating by making use of a slope in a sterilizing tank, wherein the outer circumference is formed in a cylindrical form, the bottom is closed, the top is open, and the inner wall surface is cylindrical or polygonal, one or a plurality of longitudinal protrusions of same or different heights are provided on each side of the inner wall of the container, and one or a plurality of agitation members raised from the bottom are provided in the space of the container.

20. A container for sterilizing and cooking of any one of claims 13 to 19, wherein the inner wall of the container is a slope gradually decreasing in the opening area from the upper part toward the lower part.

21. A container for sterilizing and cooking of any one of claims 13 to 19, wherein one or a plurality of vent holes or meshes penetrating inside and outside the peripheral wall of the container are provided.

22. A container for sterilizing and cooking of any one of claims 13 to 19, wherein the shape of the inner bottom of the container is a plane, slope, concave sphere, concave cone, concave pyramid, convex cone, convex pyramid, or convex sphere.

23. A container for sterilizing and cooking of any one of claims 13 to 19, wherein one or a plurality of tiny holes are provided in the bottom of the container.

24. A container for sterilizing and cooking of any one of claims 13 to 19, wherein a plurality of protrusions of same or different heights are provided in the inner bottom of the container.

25. A container for sterilizing and cooking of any one of claims 15, 17 to 19, wherein the agitation member is formed to gradually increase in the sectional area from the upper end toward the lower end.

26. A container for sterilizing and cooking of any one of claims 13 to 19, wherein one or a plurality of holes are provided in the inner bottom of the container at a slight distance from the bottom.

27. A container for sterilizing and cooking of any one of claims 13 to 19, wherein the material of the container is plastics such as polymethyl pentene, or metals, that withstand high temperature and are permitted in the Food Sanitation Law.

28. A sterilizing method of liquid matter containing solid matter comprising the steps of:

separating said solid matter from liquid matter containing solid matter;

sterilizing said liquid matter;

weighing and dispensing a one portion pack of said solid matter into a plurality of retainers;

moving said retainers into a sterilizing compartment;

sterilizing said solid matter by evacuating said sterilizing compartment and subsequently injecting steam into said sterilizing compartment;

oscillating said sterilizing compartment up and down in the manner of a seesaw while said solid matter is being sterilized, wherein said retainers roll back and forth within said sterilizing compartment because of said oscillation, resulting in said solid matter being mixed within said retainers;

evacuating and cooling said sterilizing compartment;

moving said retainers into a clean booth;

filling individual packages with said liquid matter and said solid matter from said retainers.

29. A sterilizing method of liquid matter containing solid matter comprising the steps of:

separating said solid matter from said liquid matter containing solid matter;

sterilizing said liquid matter;

weighing and dispensing a one portion pack of said solid matter into a plurality of retainers;

moving said retainers into a pre-heating compartment;

evacuating said pre-heating compartment and subsequently injecting steam into said pre- heating compartment to raise a temperature of said solid matter;

moving said retainers into a sterilizing compartment;

sterilizing said solid matter by evacuating said sterilizing compartment and subsequently injecting steam into said sterilizing compartment;

oscillating said sterilizing compartment up and down in the manner of a seesaw while said solid matter is being sterilized, wherein said retainers roll back and forth within said sterilizing compartment because of said oscillation, resulting in said solid matter being mixed within said retainers;

moving said retainers into a vacuum cooling compartment;

evacuating and cooling said vacuum cooling compartment;

moving said retainers into a clean booth;

filling individual packages with said liquid matter and said solid matter from said retainers.

* * * * *